United States Patent
Lee et al.

(10) Patent No.: US 6,806,624 B2
(45) Date of Patent: Oct. 19, 2004

(54) MICROELECTROMECHANICAL GENERATOR USING BUBBLES

(75) Inventors: Yoon Pyo Lee, Seoul (KR); Ho-Young Kim, Seoul (KR); Kwang Ho Kim, Seoul (KR); Young Il Kim, Seoul (KR); Dae-Young Lee, Seoul (KR); Seo Young Kim, Seoul (KR); Kyung Ho Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 109 days.

(21) Appl. No.: 10/291,138

(22) Filed: Nov. 8, 2002

(65) Prior Publication Data

US 2003/0160543 A1 Aug. 28, 2003

(51) Int. Cl.⁷ .............................................. H01L 41/113
(52) U.S. Cl. ...................... 310/339; 310/341; 310/342; 310/343; 310/353
(58) Field of Search ................................ 310/330–332, 310/339–343, 353

(56) References Cited

U.S. PATENT DOCUMENTS

| | | | | |
|---|---|---|---|---|
| 2,522,389 A | * | 9/1950 | Mason | 310/323.01 |
| 2,531,230 A | * | 11/1950 | Mason | 290/1 R |
| 2,532,096 A | * | 11/1950 | Hartley | 60/531 |
| 4,387,318 A | * | 6/1983 | Kolm et al. | 310/330 |
| 5,039,901 A | * | 8/1991 | Newbould | 310/339 |
| 5,801,475 A | * | 9/1998 | Kimura | 310/319 |
| 2002/0043895 A1 | * | 4/2002 | Richards et al. | 310/328 |

FOREIGN PATENT DOCUMENTS

| | | | | |
|---|---|---|---|---|
| JP | 12-225704 | | 8/2000 | B41J/10/05 |
| JP | 2003-259664 | * | 9/2003 | H02N/2/00 |

* cited by examiner

*Primary Examiner*—Thomas M. Dougherty
(74) *Attorney, Agent, or Firm*—Jones Day

(57) ABSTRACT

A micro-electro-mechanical generator has a liquid chamber, a heating block, an elongated elastic piezoelectric plate and a pair of electrodes. The liquid chamber is defined by bottom blocks which include the heating block and side walls, and can maintain a liquid. The heating block generates bubbles within the liquid chamber. The elongated elastic piezoelectric plate has a piezoelectric material layer, and is positioned in the liquid chamber adjacent to an upper portion of the heating block. The elongated elastic piezoelectric plate is deformable by contact with the bubbles, wherein a first end of the elongated elastic piezoelectric plate is a free end and a second end of the elongated elastic piezoelectric plate is a fixed end. The pair of electrodes are electrically connected to the piezoelectric material layer.

16 Claims, 9 Drawing Sheets

MICROELECTROMECHANICAL GENERATOR USING BUBBLES

FIELD OF THE INVENTION

The present invention relates to generators for use in micro-electro-mechanical systems, and particularly to a micro-electro-mechanical generator for generating electricity by using energy from bubble growth generated in liquid by a heat source, such as body heat from a human being.

BACKGROUND OF THE INVENTION

A generator using a heat source having a temperature similar to body temperature, may serve as a power source for bio-micro-electro-mechanical equipment such as blood sugar level monitoring devices, blood pressure monitors, drug dosage units, artificial organs, micro robots for surgical operation, etc., in micro-electro-mechanical systems (MEMS). These generators may use heat emitted from a CPU, so that they can serve as a cooling device for subminiature electronic appliances having a CPU or general electricity-reproduction apparatuses for MEMS.

Currently under-way studies on generators for MEMS are conducted mainly by academic groups and broadly divided into studies on combustion systems which burn liquid combustibles such as hydrocarbon based fuel to generate electricity, studies on thermoelectric elements, and study on fuel cells.

Attempts to develop a combustion system include a study on micro gas turbines having a diameter of about 10 mm, thickness of 3 mm, weight of 1 g and electric power capacity of 16 W generated by burning fuel at a rate of 7 g per hour, and a study on internal combustion engines having a volume of 8 cubic mm, are under way.

Power generation systems employing thermoelectric elements use the Peltier Effect and are based on electromotive force generated when different temperature conditions are applied to two materials. Some of the development groups have been trying to provide thermoelectric elements with different temperature conditions, in which the high temperature condition is obtained by fuel combustion.

The fuel cell is a known device in which electrical energy is generated using hydrogen, oxygen, a proton exchange membrane, etc., while water is obtained as a byproduct. This device has been used in macro scale systems. Recently, studies are under way to allow this type of device to be available in the MEMS.

The studies described above, however, have not yet developed conspicuous results in the art and even if they develop practical results, the results may have a limited applicable field as most are adapted to use a heat source having a very high temperature.

SUMMARY OF THE INVENTION

It is, therefore, a main object of the present invention to provide a micro-electro-mechanical generator using a heat source having a relatively low temperature, e.g. body temperature.

Another object of the present invention is to provide a micro-electro-mechanical generator which does not need a separate energy source for power generation and avoids periodic re-supply or frequent replacement.

These objects and other objects, which will become apparent to those skilled in the art, are accomplished with a micro-electro-mechanical generator comprising a liquid chamber further comprised and defined by bottom blocks and side walls. The chamber is adapted to confine a liquid therein. A bubble generation means for generating bubbles is disposed within the liquid chamber. The micro-electro-mechanical generator also has elastic piezoelectric plates, each of which is further comprised of a piezoelectric material layer, and a first and a second ends. The piezoelectric material layer is positioned in the liquid chamber adjacent to the upper portion of the bubble generation means. The elongated elastic piezoelectric plate deforms with contact with the generated bubbles, and the first end of the elongated elastic piezoelectric plate is a free end, while the second end of the elongated elastic piezoelectric plate is a fixed end. A pair of electrodes are electrically connected to the piezoelectric material layer.

The micro-electro-mechanical generator may also have a heat sinking means formed on an upper surface of the liquid chamber. The bubble generation means is a metal block forming at least a portion of the bottom blocks of the liquid chamber, and thermally connected to a heat source. The remaining portions of the bottom blocks other than the metal block can be made of a thermal insulation material. The second end of the elongated elastic piezoelectric plate is fixed to one of the side walls. The side walls of the liquid chamber are made of a thermal insulation material. The micro-electro-mechanical generator may also have an electric capacitor electrically connected to the pair of electrodes.

BRIEF DESCRIPTION OF DRAWINGS

The above and other objects and features of the present invention will become more apparent from the following description of the preferred embodiments given in conjunction with the accompanying drawings.

DETAILED DESCRIPTION OF THE PRESENT INVENTION

Preferred embodiments of the present invention will now be described with reference to the accompanying drawings.

Figure 2A:
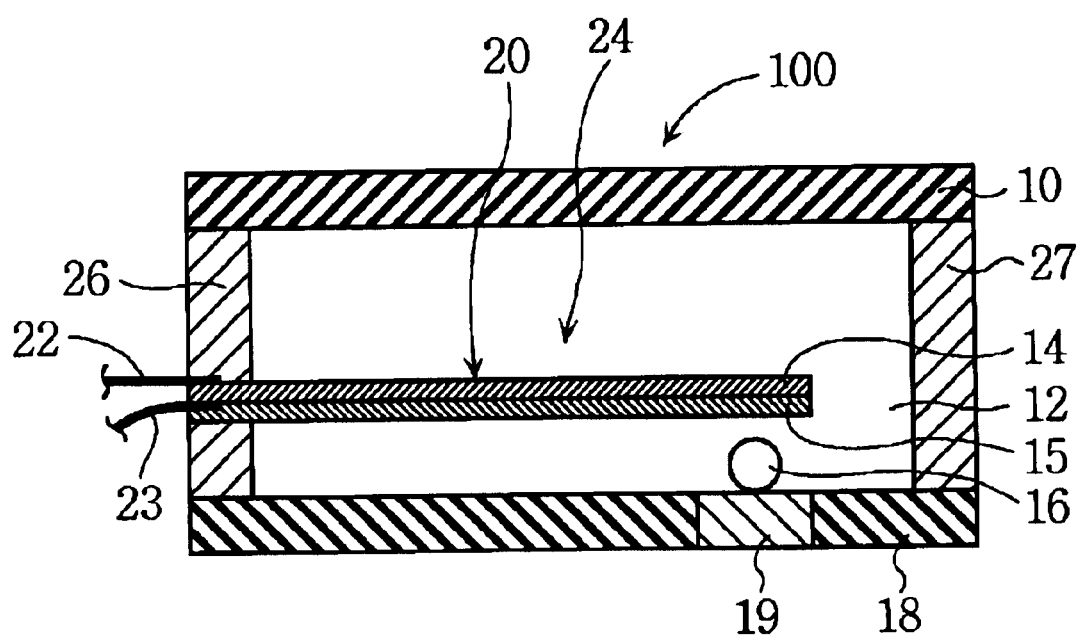
FIGS. 2a to 2d depict side sectional views of a power generation process of the inventive generator using bubbles.

FIG. 2a is a side sectional view of the generator 100 in accordance with the preferred embodiment of the present invention. The inventive generator 100 has a configuration wherein power generation is achieved by bubbles, and includes a liquid chamber 24.

The liquid chamber 24 is defined with bottom blocks 18, 19 and side walls 26, 27 within which a liquid is kept. Submerged in the liquid 12 is an elastic piezoelectric plate 20. The bottom blocks include an adiabatic block 18 and a heating block 19, and the side walls include a first wall 26 and a second wall 27.

The heating block 19 functions to supply heat to a particular portion of the liquid 12 to generate bubbles. In the preferred embodiment, the heating block is made of metal. An upper surface of the heating block 19 is adapted to be exposed inside the liquid chamber 24 to transfer heat to the liquid 12. A lower surface of the heating block 19 is thermally connected to a heat source (not shown), so that heat is transferred to the heating block 19 from the heat source in various manners, e.g. conduction, convection or radiation. A preferred embodiment is adapted to use body heat of a human being or heat emitted from a CPU in a computer system as a heat source.

For the liquid 12 within the liquid chamber 24, it is preferable to employ liquids having boiling point similar to the normal body temperature of a human being. For example, R141B($CH_3CCLF_2$), FC72($C_6F_{14}$) is a possible liquid 12. An appropriate liquid is selected depending on its boiling point.

The adiabatic block 18 is made of a thermal insulation material to prevent heat from being dissipated from liquid chamber 24 in an uncontrolled manner.

The first wall 26 constitutes the left side wall of the liquid chamber 24 and the second wall 27 is opposite to the first wall 26. The walls are made of thermal insulation materials to hinder heat transfer between the liquid chamber 24 and the outside. The first wall 26 supports one end of the elastic piezoelectric plate 20.

The elastic piezoelectric plate 20 generates electricity by being resiliently deformed by bubbles 16 which are generated by heat supplied from the heating block 19. The elastic piezoelectric plate 20 includes a shape maintenance layer 15 and a piezoelectric material layer 14. The shape maintenance layer 15 maintains an overall shape of the elastic piezoelectric plate 20 and has elasticity, so that it can be resiliently returned to its initial shape or position after being deformed.

In the preferred embodiment, the shape maintenance layer 15 is preferably, made of silicon or silicon nitride.

The piezoelectric material layer 14 is formed on an upper surface of the shape maintenance layer 15. The piezoelectric material layer 14 is made of piezoelectric material which has an electric potential difference when a stress occurs therein due to its deformation. The piezoelectric material layer 14 can be formed by applying the piezoelectric material in liquid-like state to the upper surface of the shape maintenance plate 15. A preferred embodiment uses Lead Zirconium Titanate as the piezoelectric material.

Figure 1:
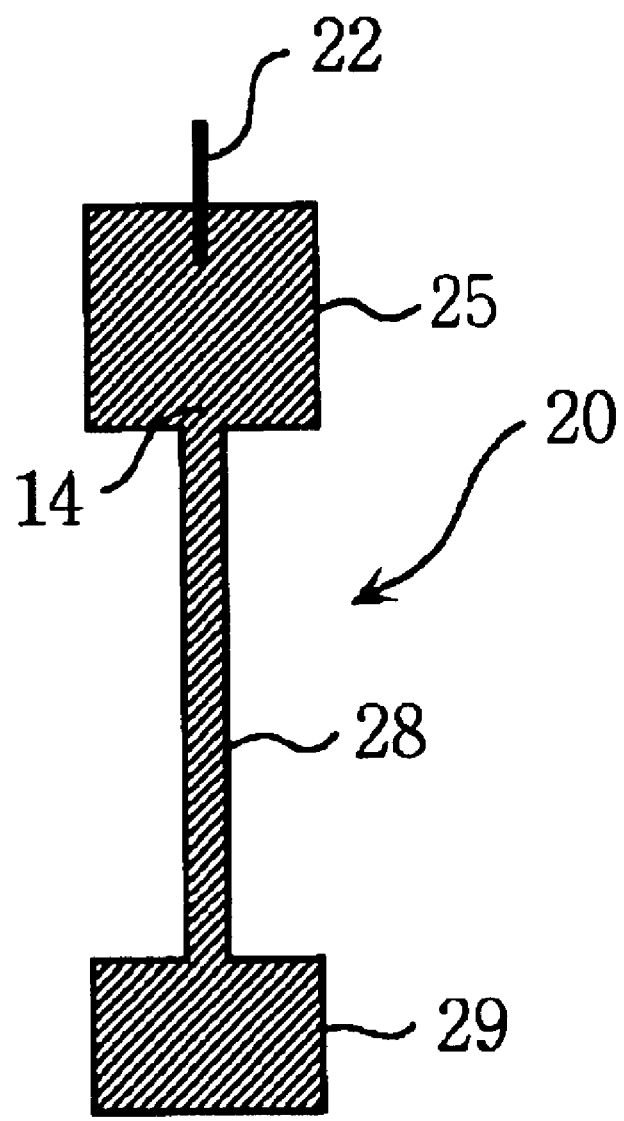
FIG. 1 is a top planar view of an elastic piezoelectric plate employed in the inventive generator using bubbles.

Referring to FIG. 1, in the preferred embodiment, the elastic piezoelectric plate 20 has a base 25 which is the portion secured to the first wall 26, a contact section 29 on which the bubbles are contacted and a connection section 28 connecting the base 28 to the contact section 29.

Figure 4:
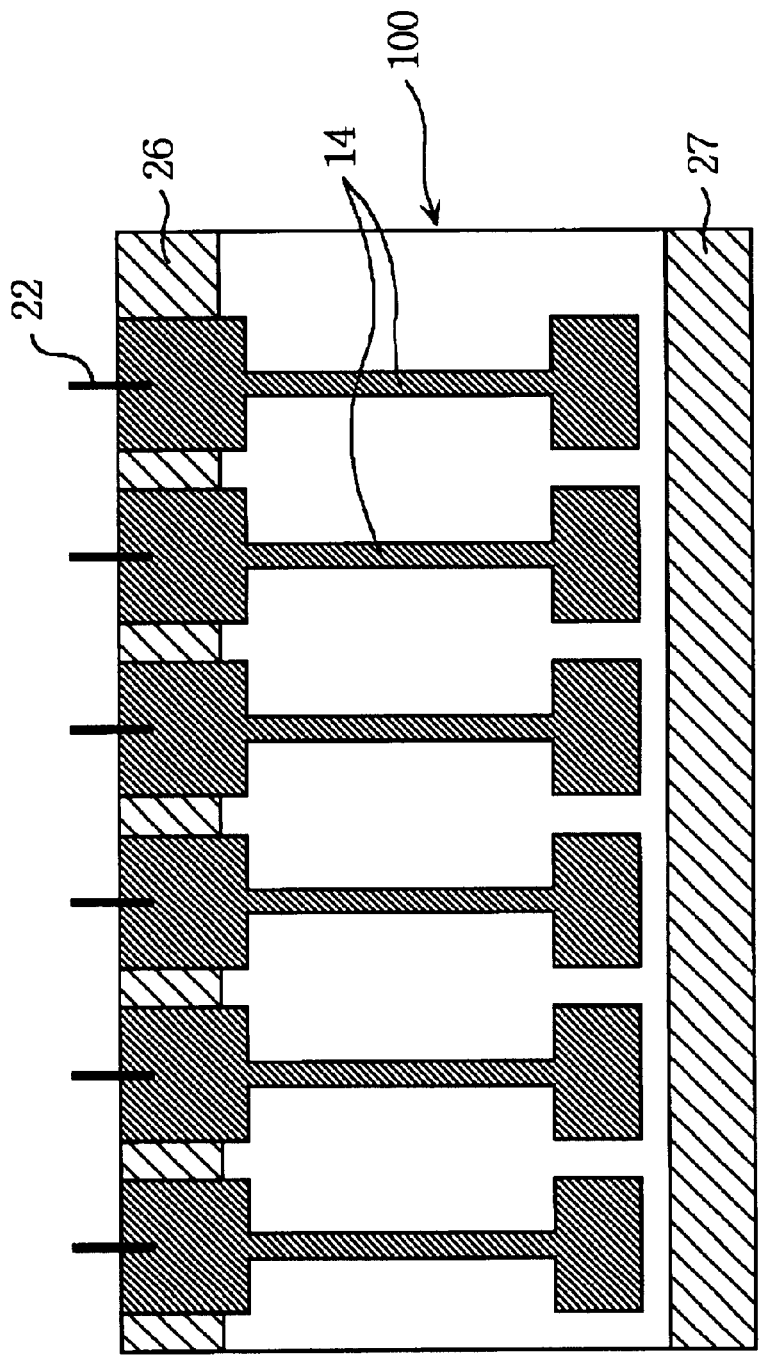
FIG. 4 is a top sectional view of the inventive generator shown in FIGS. 2a to 2d.
Figure 5:
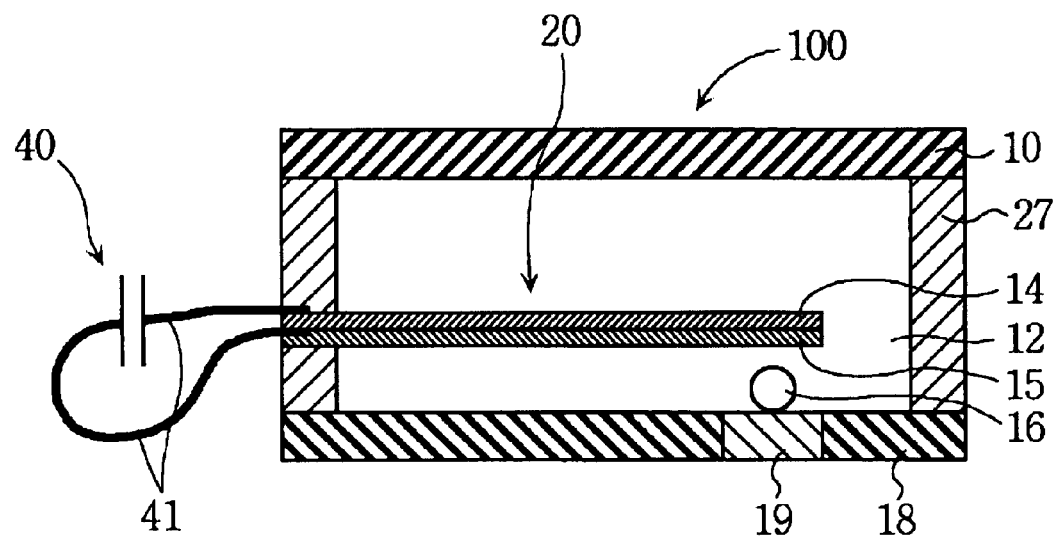
FIG. 5 is a schematic view of the inventive generator shown in FIGS. 2a to 2d, to which an electric capacitor is electrically connected to accumulate electric charge generated in the generator.

As shown in FIGS. 2a and 4, the base 25 is inserted into the first wall 26 and is fixed thereto at the rear end of first wall 26. A pair of electrodes 22 and 23 are attached to an upper portion and a lower portion of the piezoelectric material layer 14, respectively, at material 14 rear portion. A lower surface of the contact section 29, i.e., the lower surface of the shape maintenance layer 15, is a portion which the bubbles 16 contact and has an enlarged surface area in order to allow the bubbles 16 to push the elastic piezoelectric plate 20 over more widened surface area. The connection section 28 connecting the base 25 and the contact section 29 has a narrow width to allow the elastic piezoelectric plate 20 to be easily deformed.

A heat sink block 10 is formed on an upper portion of the liquid chamber 24, i.e., on upper surfaces of the first wall 26 and the second wall 27. The heat sink block 10 is thermally connected to a heat sink (not shown) to have a temperature lower than that of the heating block 19. As a result, the bubbles 16 that are generated by the heating block 19 move upward and condensed to a liquid state near the heat sink block 10.

Operation of the generator 100 in accordance with the preferred embodiment of the present invention is now described with reference to FIGS. 2a through 2d.

Figure 2B:
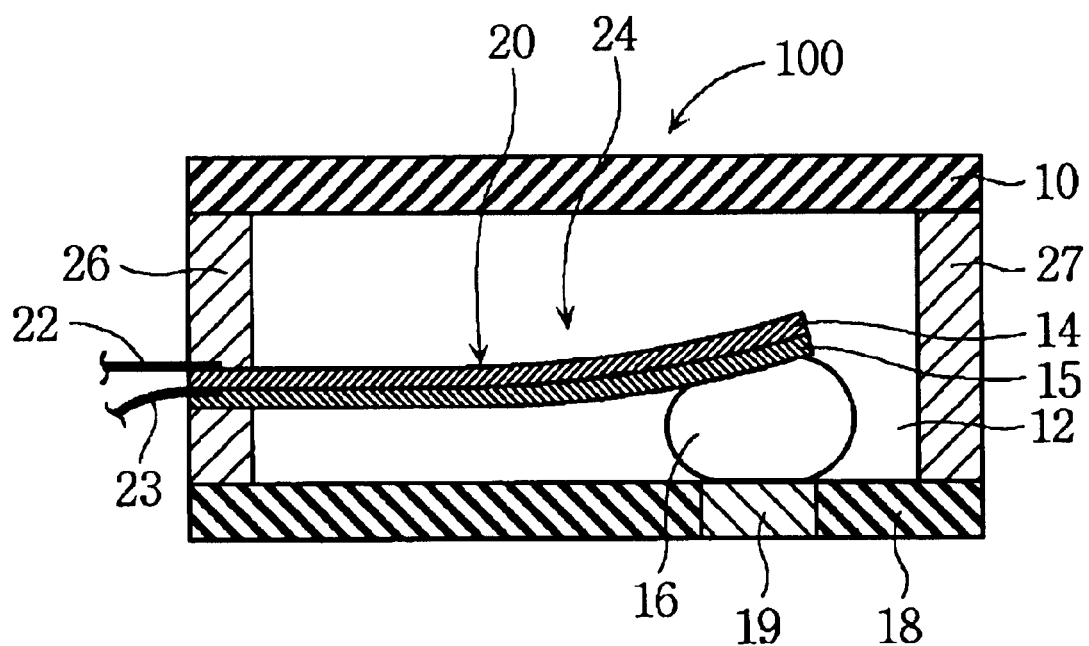

As shown in FIG. 2a, by heat transfer from the heat source (not shown) to the heating block 19, the liquid near the heating block 19 is heated over its boiling point and bubbles 16 are generated. Then, as shown in FIG. 2b, the generated bubbles 16 grow to a larger diameter and finally contact the lower surface of the contact section 29 of the elastic piezoelectric plate 20. Next, the elastic piezoelectric plate 20 is deformed or deflected upward due to depressing forces caused by the bubbles 16, e.g., a force occurring when the internal energy of the bubbles 16 increases to inflate the bubbles 16, a rising force of the bubbles 16, etc. During the deformation of the elastic piezoelectric plate 20, an electric potential difference occurs between the pair of electrodes 22 and 23.

Figure 2C:
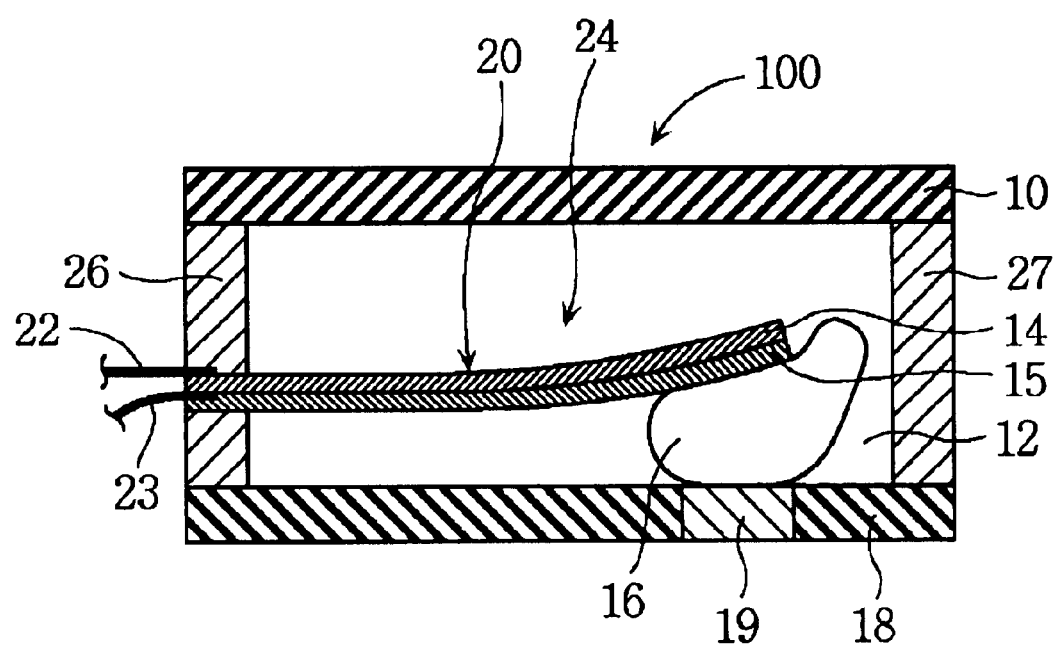

As shown in FIG. 2c, when the elastic piezoelectric plate 20 is deformed in maximum magnitude, the electric potential difference between the electrodes 22 and 23 is maximized. Subsequently, bubbles 16 depressing the elastic piezoelectric plate 20 move upward and slide under the lower surface of the elastic piezoelectric plate 20 positioned inclined.

Figure 2D:
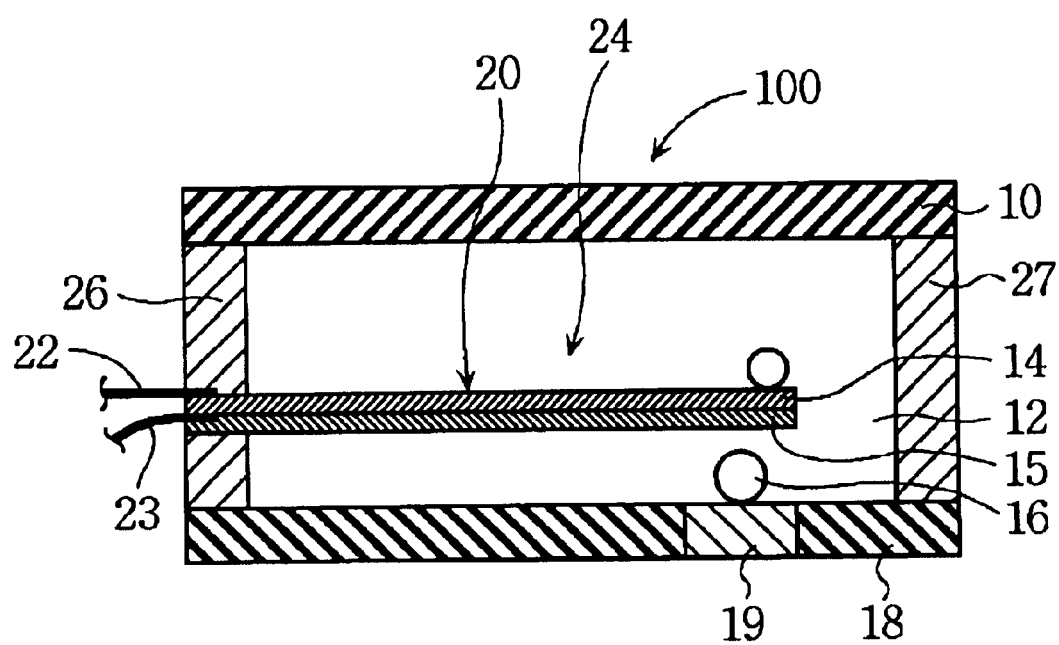

As shown in FIG. 2d, when the depressing force by the bubbles 16 is removed on escape of bubbles 16 from under the elastic piezoelectric plate 20, the elastic piezoelectric plate 20 returns to its initial position. After that, the elastic piezoelectric plate 20 is deformed again by subsequent bubbles 16 and then returned to the non-deformed position. In this way, the deformation and the return of the elastic piezoelectric plate 20 are repeated in a periodic manner.

Since electricity generation due to the repetition of deformation and the return of the elastic piezoelectric plate 20, is made intermittently, the pair of electrodes 22 and 23 can be connected to an electric capacitor 40 through wires 41 in order to accumulate the electricity in the electric capacitor 40 whenever the electricity is generated. The use of the capacitor 40 may be useful in a situation where a higher level of electricity is required.

In a modification shown in FIG. 4, a plurality of elastic piezoelectric plates 20 are used to obtain a higher magnitude of electricity. In this case, a single or more capacitors (not shown) may be also used to accumulate the electricity generated in the elastic piezoelectric plates 20.

Figure 3A:
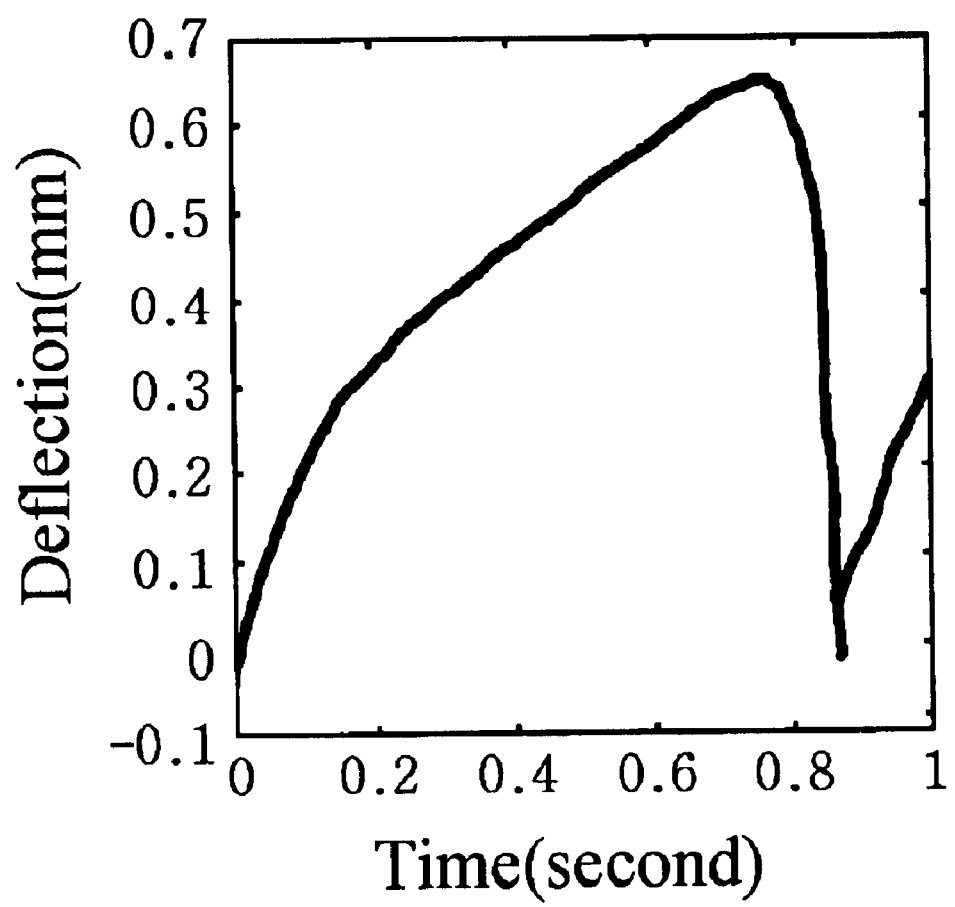
FIG. 3a presents a graph showing variations of deflection of the elastic piezoelectric plate at its free end over time.
Figure 3B:
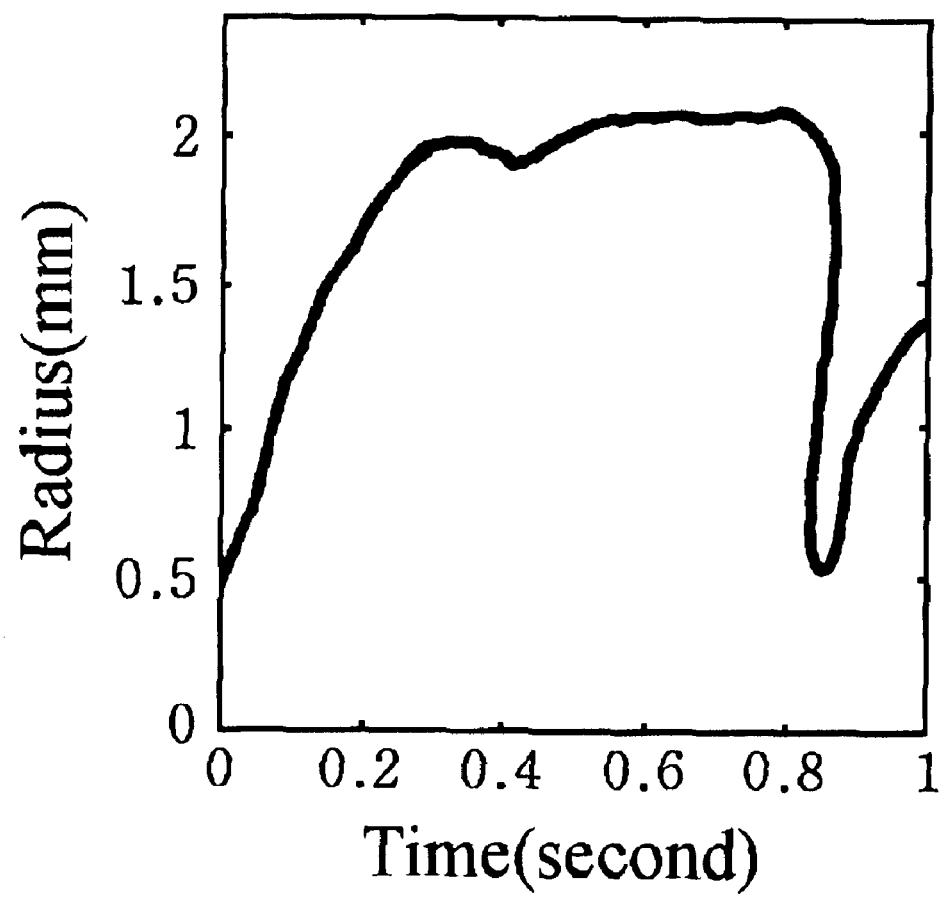
FIG. 3b is a graph representing change in radius of a contact surface of the bubble against the elastic piezoelectric plate.

Graphs tabulating results of electricity generation using bubbles are shown in FIGS. 3a and 3b. The graph illustrated in FIG. 3a shows variations of deflection at the end of the elastic piezoelectric plate 20 with respect to time change, while the graph of FIG. 3b shows variations of radius of a surface of the bubbles 16 in contact with the elastic piezoelectric plate 20.

Referring to FIG. 3a, it can be understood that deflection of the elastic piezoelectric plate 20 is gradually increased to reach a maximum value over time change ranging from 0 second to 0.8 second and then sharply drops. The graph shown in FIG. 3a explains that the elastic piezoelectric plate 20 gets to the state shown in FIG. 2c from the state shown in FIG. 2a for 0.8 second and, right after that, it is positioned as the state shown in FIG. 2d. The graph also shows that subsequent deformation cycle is triggered at about 0.82 second.

Referring to FIG. 3b, it is possible to observe variations of the contact area of the bubbles 16 against the contact section 29 of the elastic piezoelectric plate 20 with respect to time change. In a time range from 0.3 second to 0.8 second, the bubbles 16 have a constant radius of about 2 mm. During this time period, the elastic piezoelectric plate 20 is deformed upward.

The inventive generator using a heat source having a relatively lower temperature, e.g. body heat or heat emitted from a CPU, may serve as a semi-permanent power source for bio-micro-electro-mechanical equipment such as blood sugar level measuring devices, blood pressure monitors, drug dosage units, artificial organs, micro robots for surgical operation, etc. These generators may serve as a cooling device for subminiature electronic appliances equipped with the CPU or general electricity-reproduction devices.

While the present invention has been shown and described with respect to particular embodiments, it will be apparent to those skilled in the art that many changes and modifications may be made without departing from the spirit and scope of the invention as defined in the appended claims.

What is claimed is:

1. A micro-electro-mechanical generator comprising:
    a liquid chamber further comprised and defined by bottom blocks and side walls, the chamber adapted to confine a liquid therein; a bubble generation means for generating bubbles within said liquid chamber;
    at least one elongated elastic piezoelectric structure further comprising a piezoelectric material layer, and a first and second ends, the piezoelectric material layer positioned in said liquid chamber adjacent said upper portion of said bubble generation means, the elongated elastic piezoelectric structure being deformable by contact with said bubbles, and the first end of the elongated elastic piezoelectric structure is a free end and the second end of the elongated elastic piezoelectric structure is a fixed end; and
    a pair of electrodes electrically connected to said piezoelectric material layer.

2. The micro-electro-mechanical generator of claim 1, further comprising a heat sinking means formed on an upper surface of said liquid chamber.

3. The micro-electro-mechanical generator of claim 1, wherein said bubble generation means is a metal block fanning at least a portion of said bottom blocks of said liquid chamber, and thermally connected to a heat source.

4. The micro-electro-mechanical generator of claim 3, wherein remaining portions of said bottom blocks other than said metal block, is made of a thermal insulation material.

5. The micro-electro-mechanical generator of claim 1, wherein said second end of said elongated elastic piezoelectric structure, is fixed to one of said side walls.

6. The micro-electro-mechanical generator of claim 1, wherein said side walls are made of a thermal insulation material.

7. The micro-electro-mechanical generator of claim 5, wherein said side walls are made of a thermal insulation material.

8. The micro-electro-mechanical generator of claim 1, further comprising an electric capacitor electrically connected to said pair of electrodes.

9. A micro-electro-mechanical generator comprising:
    a liquid chamber having a bottom and side walls, the chamber adapted to confine a liquid therein;
    a bubble generator for generating bubbles within said liquid chamber;
    at least one elongated elastic piezoelectric structure further comprising a piezoelectric material layer and having first and second ends, the piezoelectric material layer positioned in said liquid chamber adjacent said upper port ion of said bubble generator, the elongated elastic piezoelectric structure being deformable by contact with said bubbles, and the first end of the elongated elastic piezoelectric structure being a free end and the second end of the elongated elastic piezoelectric structure being a fixed end; and
    a pair of electrodes electrically connected to said piezoelectric material layer.

10. The micro-electro-mechanical generator of claim 9, further comprising a heat sink formed on an upper surface of said liquid chamber.

11. The micro-electro-mechanical generator of claim 9, wherein said bubble generator is a metal block forming at least a portion of the bottom of said liquid chamber, and thermally connected to a heat source.

12. The micro-electro-mechanical generator of claim 11, wherein remaining portions of said bottom other than said metal block are made of a thermal insulation material.

13. The micro-electro-mechanical generator of claim 9, wherein said second end of said elongated elastic piezoelectric structure is fixed to one of said side walls.

14. The micro-electro-mechanical generator of claim 13, wherein said side walls are made of a thermal insulation material.

15. The micro-electro-mechanical generator of claim 9, wherein said side walls are made of a thermal insulation material.

16. The micro-electro-mechanical generator of claim 9, further comprising an electric capacitor electrically connected to said pair of electrodes.

* * * * *